United States Patent [19]

McGlashen

[11] Patent Number: 4,708,840
[45] Date of Patent: Nov. 24, 1987

[54] MANUFACTURE OF PNEUMATIC TIRES
[75] Inventor: James N. McGlashen, Near Wigan, England
[73] Assignee: Apsley Metals Limited, a British Company, United Kingdom
[21] Appl. No.: 855,157
[22] Filed: Apr. 23, 1986

Related U.S. Application Data

[62] Division of Ser. No. 576,578, Feb. 3, 1984, Pat. No. 4,597,728.

[30] Foreign Application Priority Data

Feb. 24, 1983 [GB] United Kingdom ............... 8305084

[51] Int. Cl.⁴ .............................................. B29H 5/04
[52] U.S. Cl. .................................. 264/501; 156/129; 264/315; 264/326
[58] Field of Search ...................... 156/96, 128.1, 126, 156/129; 264/36, 315, 326, 501, 502; 425/23, 35, 49, 51, 43, 52, 54, 383, 389, 393, 17, 23, 58, 403

[56] References Cited

U.S. PATENT DOCUMENTS 3,425,093  2/1969  Ansette .............................. 425/393
3,963,393  6/1986  Barefoot ............................ 425/23
3,999,907  4/1976  Pappas .............................. 425/20
4,116,596 10/1977  Pizzorno ............................ 425/55
4,328,053  8/1980  Medlin, Jr. ........................ 156/96

FOREIGN PATENT DOCUMENTS 1082360  8/1953  France .
1179820  7/1957  France .
1559772 10/1975  United Kingdom .
1545224 10/1976  United Kingdom .

Primary Examiner—Jay H. Woo
Assistant Examiner—Timothy W. Heitbrink
Attorney, Agent, or Firm—Stevens, Davis, Miller & Mosher

[57] ABSTRACT

A method for consolidating an annular ring of uncured elastomeric material in a tread ring mould comprising a set of rigid segments in sliding end-to-end relationship to form a consolidation ring having a first small diameter for insertion of the segments into the elastomeric material in the tread mould and a second larger diameter at which the segments form a smooth, continuous consolidating surface, mechanical means for moving the segments from the first diameter substantially to the second diameter and a fluid pressure inflatable bag means which may be inflated behind the segments to apply consolidation force at the second diameter.

1 Claim, 4 Drawing Figures

MANUFACTURE OF PNEUMATIC TIRES

This is a division of application Ser. No. 576,578 filed Feb. 3, 1984 now U.S. Pat. No. 4,597,728.

This invention relates to the manufacture of elastomeric components and in particular to the manufacture of pneumatic tyres and the apparatus used therefor.

Vehicle tyres are assembled from many separate components some of which comprise unvulcanised elastomeric material. Conventional processes fit components such as the tyre tread by feeding a strip of compound of the required cross-section to a rotating partly assembled tyre and winding the strip as a single turn into place. The abutting ends are then rolled down together. Such processes give little control over the contact pressure between components or indeed the uniformity of the component after fitting.

Recently it has been proposed to build a tyre within a patterned mould ring and the first stage of the process is then to put a ring of tread compound into the mould ring and expand it radially outwards so as to fit it into the mould pattern.

The accuracy with which this is done and particularly the effectiveness of the consolidation of the compound has a great affect on the finished tyre particularly with regard to its uniformity and it is an object of the present invention to provide an apparatus for consolidating a ring of elastomeric material in a tread mould more accurately than hitherto.

According to one aspect of the present invention an apparatus for consolidating an annular ring of uncured elastomeric material in a tread ring mould comprises a set of rigid segments in sliding end-to-end relationship to form a consolidation ring having a first small diameter for insertion of the segments into the elastomeric material in the tread mould and a second larger diameter at which the segments form a smooth, continuous consolidating surface, mechanical means for moving the segments from the first diameter substantially to the second diameter and a fluid pressure inflatable bag means which may be inflated behind the segments to apply consolidation force at the second diameter.

The sliding end-to-end relationship is preferably by means of the ends of the segments having substantially flat surfaces at acute angles to the radial direction of the consolidation ring, each successive junction between segments being at opposite sides of the radial direction such that alternate segments may move radially with respect to the other segments.

Preferably a single inflatable bag is used which is annular and extends around the set of rigid segments so that the constant force is applied around the assembly on inflation.

The inflatable bag means may be integral with the mechanical means but more preferably, to allow a substantial change in diameter to be provided by the mechanical means, the inflatable bag means is separate from the mechanical means and may be brought into engagement with the segments after the mechanical means has provided most of the required movement.

The mechanical means may comprise a cam and cam follower mechanism axially at either side of the ring of segments. This may be operated by a rotatable shaft which forms a support for the assembly.

According to another aspect of the present invention a method of consolidating a tyre component into a circular mould or ring comprises radially moving a set of rigid segments in sliding end-to-end relationship from a first diameter to a second different diameter at which the assembly of segments form a smooth, continuous, consolidating surface in which the movement comprises a first mechanical movement and a second fluid pressure operated movement to provide the final consolidation.

Preferably the segments are moved radially outwards from the first diameter to the second diameter and the second fluid pressure operated movement is provided by an inflatable bag which is moved axially into the ring of segments just before the bag is inflated for the final consolidation.

Further aspects of the present invention will be apparent from the following description, by way of example only, of one embodiment in conjunction with the attached diagrammatic drawings in which.

Figure 1:
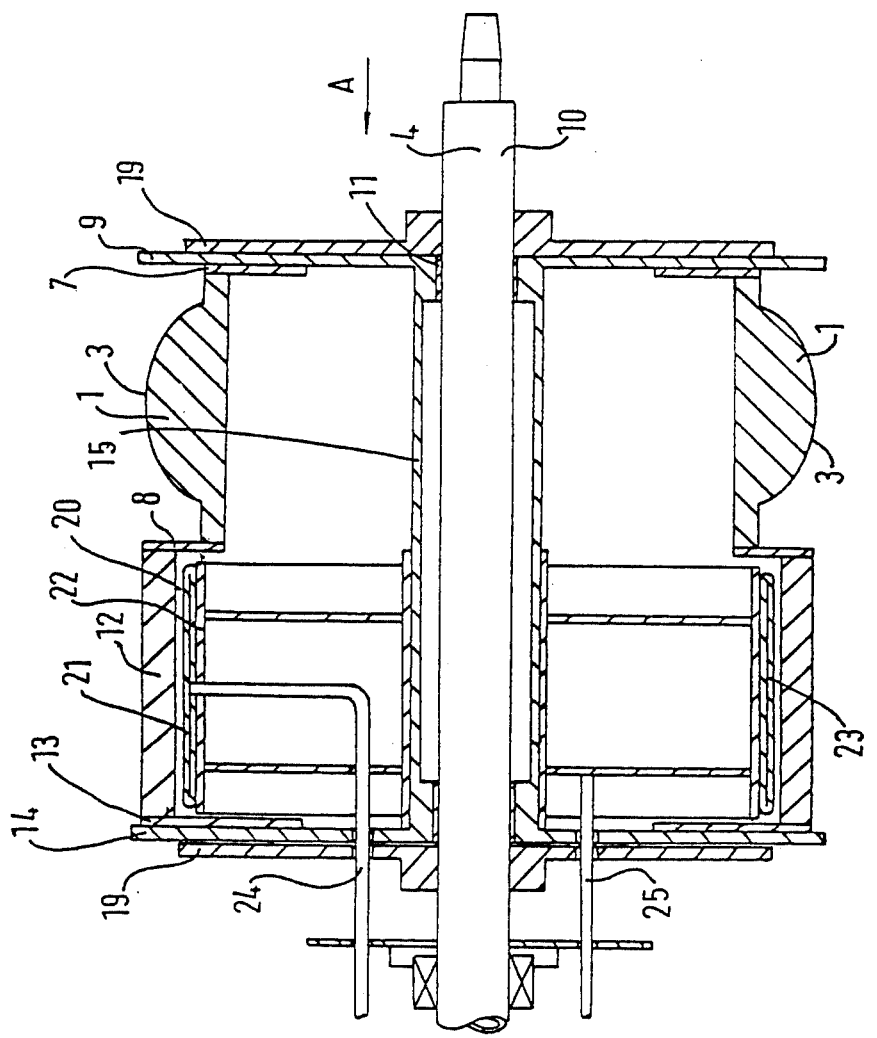
FIG. 1 is a cross-sectional view of a consolidation head in the first small diameter position.
Figure 3:
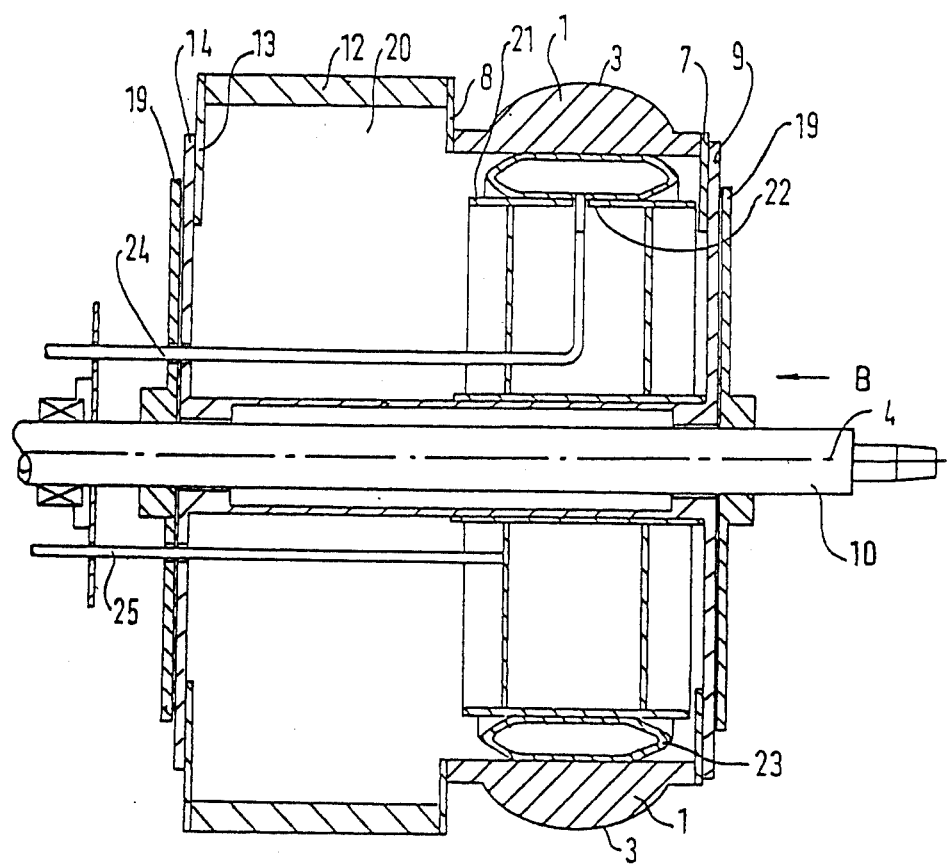
FIG. 3 is a cross-sectional view as in FIG. 1 with the consolidating head in the second consolidating diameter portion.
Figure 4:
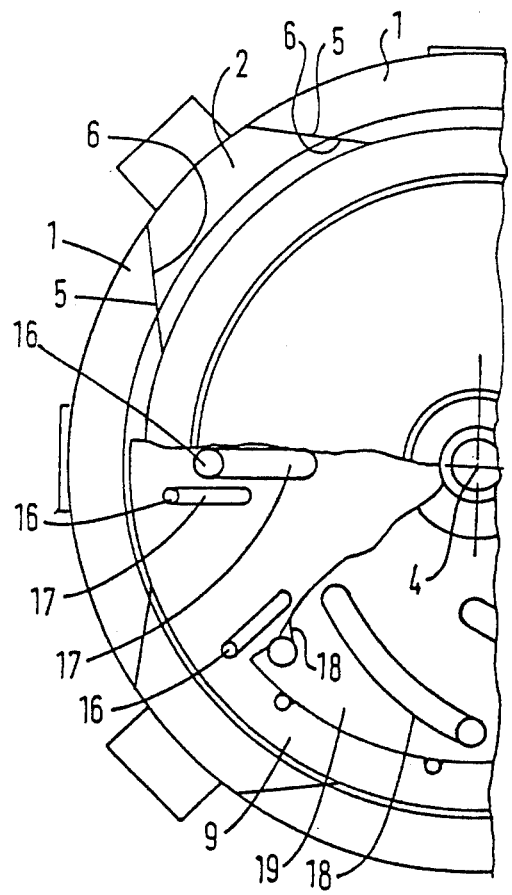
FIG. 4 is an end view in the direction of arrow B in FIG. 3.

The consolidation head comprises a series of eight segments 1 & 2 each of which has an outer cross-sectional profile 3, as shown in FIG. 1. The segments are of two different types assembled alternately end-to-end about an axis 4 so that a consolidation drum of continuous solid form is obtained when the segments are in the second or outermost portion of FIG. 3. The end faces 5,6 of each segment 1 & 2 are machined at an acute angle of about 30° to the radial direction such that the end faces may slide upon one another so that the segments 2 may slide radially inwards substantially more than the segments 1 to give a first position of small overall diameter as shown in FIGS. 1 and 2 and a second position of large overall diameter as shown in FIGS. 3 and 4 when the continuous solid outer surface is provided.

The segments 1 and 2 are each mounted between a pair of flange plates 7 and 8 one at either side. The right hand or first flange plates 7 are all in sliding abutment with a circular guide plate 9 which is rotatably mounted on a main support shaft 10 by a bearing 11. The left-hand flange plates 8 project radially outwards, one from each segment 1 & 2 and are connected by intermediate, axially extending link segments 12 to circular end flange plates 13 which are in sliding abutment with a second circular guide plate 14. The second circular guide plate 14 is rotatably mounted on the main support shaft 10 and is integral with the other guide plate 9 by means of a connecting tube 15. Thus the eight segments 1 & 2 are each slidable radially outwards between the guide plates 9 and 14 by means of sliding between the end flange plates 7 and 13.

Figure 2:
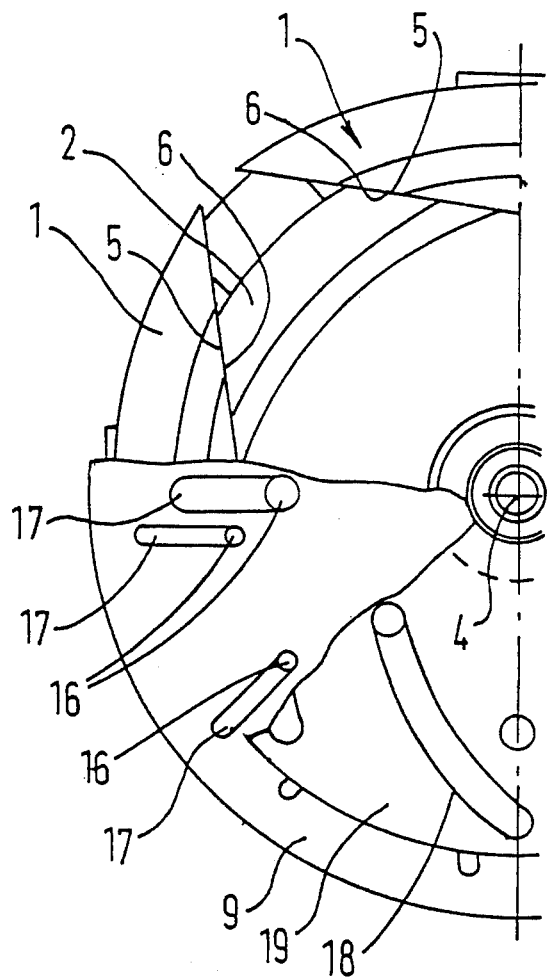
FIG. 2 is a part end view in the direction of arrow A in FIG. 1.

Mechanical means for radially moving the segments comprises two guide rollers 16 which are mounted on each end flange plate 7 and 13 and which project in an axial direction through guide slots 17 cut in the guide plates 9 and 14 (see FIG. 2). These slots 17 extend in a radial direction and control the relative positions of the eight segments 1,2. The guide rollers 16 extend further than the end flange plates 7 and 13 to engage drive slots 18 formed in one of two iris plates 19 which are positioned on either end of the assembly. The iris plates 19 are both keyed onto the support shaft 10 and the drive slots 18 are shaped so that rotation of the iris plate 19 with respect to the end flange plates 7 and 13 moves the segments 1 and 2 radially inwards or outwards guided by the guide slots 17 so that the ends 5 and 6 slide over one another.

It should be noted that the intermediate link segments 12 are positioned radially outwards of the consolidation segments 1 and 2 such that a chamber 20 is provided to the left of the segments in the first radially inward position of FIG. 1 which chamber accommodates an air bag consolidation system 21. The air bag consolidation system 21 comprises a rigid support cylinder 22 which is in sliding engagement upon the connecting tube 15 so that the cylinder may be moved axially from the chamber 20 to the right beneath the segments 1 and 2. A low sectional height air bag 23 is mounted on the cylinder 22 and an air supply pipe 24 is connected to it. Push rods 25 are also mounted to the cylinder 22 to allow axial movement when required.

The consolidation head is operated by firstly setting the position of FIGS. 1 and 2 with the cylinder 22 and air bag 23 deflated and positioned fully to the left-hand position and the iris plates 19 rotated to bring the segments 1 and 2 into the radially inner positions shown. The consolidation head is then moved axially into a tread ring mould which has already been filled with tread compound and which it is intended to consolidate into the mould.

The iris plates 19 are then rotated to move the segments 1 and 2 radially outwards. As the segments 1 and 2 approach their second outer diameter positions shown in FIGS. 2 and 3 the cylinder 22 and air bag 23 are pushed to the right to be under the segments 1 and 2 and the air bag is inflated. The air pressure completes the segment movement applying substantial pressure to each segment and thus providing good consolidation.

The use of the mechanical segment ring system for the long travel and the air bag for the short final, balanced pressure consolidation allows an air bag to be used which is substantially the width of the segments which gives an efficient and even distribution of pressure beneath the segments.

It should be understood that other fluid means may be used to inflate the bag and other bag shapes are also practicable.

Furthermore alternative mechanical means may be used for the main mechanical movement.

The apparatus may also be used for consolidating components other than the tread compound (e.g. a breaker ply). The cross-sectional shape of the segments may also be changed according to the component being handled or consolidated.

I claim:

1. A method of consolidating an annulus of uncured elastomeric tread compound for a pneumatic vehicle tire in which said annulus is located radially inwards of a patterned annular tread mold, and is consolidated in the tread mold by apparatus applying a radially outwardly directed consolidation pressure to the annulus, said apparatus comprising in combination:

(a) a set of rigid segments arranged in sliding engagement to form a consolidation ring and which are radially movable between a first smaller diameter, and a second larger diameter at which the segments form a smooth continuous consolidating surface, (b) mechanical means for moving the segments radially from the first diameter substantially to said second diameter without applying substantial outward radial pressure, and (c) fluid inflatable means slidably movable from a first position alongside the rigid segments to a second position radially and axially within the rigid segments to apply radial outward pressure evenly around the radially inner surface of the consolidation ring of segments to move the segments to bring them completely to the second diameter to apply consolidation pressure to the annulus, said method comprising arranging said set of segments to said first diameter and positioning said set of segments radially inwardly of the tread in the mold, expanding the segments substantially to the second diameter by operation of said mechanical means, moving the inflatable means from said first position to said second position, and applying fluid pressure within the inflatable means to complete the segment movement to said second diameter and to apply a balanced consolidation load on the tread compound as it is held in the tread mold.

* * * * *